United States Patent [19]

Goodman et al.

[11] 4,274,945

[45] Jun. 23, 1981

[54] IRON ORE BENEFICIATION BY SELECTIVE FLOCCULATION

[75] Inventors: Richard M. Goodman, Norwalk; Hans P. Panzer, Stamford, both of Conn.

[73] Assignee: American Cyanamid Company, Stamford, Conn.

[21] Appl. No.: 92,002

[22] Filed: Nov. 7, 1979

[51] Int. Cl.³ .............................................. B03B 1/04
[52] U.S. Cl. ......................................... 209/5; 210/734
[58] Field of Search ............... 209/5; 210/54 C, 54 A, 210/734; 526/234

[56] References Cited

U.S. PATENT DOCUMENTS

| | | | |
|---|---|---|---|
| 3,215,680 | 11/1965 | Kolodny | 526/234 |
| 3,292,780 | 12/1965 | Frommez | 209/5 |
| 3,397,953 | 8/1968 | Goluin | 210/54 A X |
| 3,545,941 | 12/1970 | Wilson | 209/54 |
| 3,975,496 | 8/1976 | Smulley | 210/54 A X |
| 4,081,357 | 3/1978 | Werneke | 209/5 |
| 4,090,955 | 5/1978 | Dexter | 209/5 |

Primary Examiner—Robert Halper
Attorney, Agent, or Firm—Paul W. Leuzzi, II

[57] ABSTRACT

Selective flocculation of iron ores is accomplished through the employment of partially carboxylated polyacrylamides as the selective flocculant. The partially carboxylated polyacrylamides employed in the selective flocculation contain from about 20-65% carboxyl groups and are of a molecular weight in excess of one million. The selective flocculation process performs a separation of iron ores predominantly containing semitaconite, oxidized taconite and hematitic-goethitic jaspers from their associated siliceous gangue.

5 Claims, No Drawings

IRON ORE BENEFICIATION BY SELECTIVE FLOCCULATION

BACKGROUND OF THE INVENTION

Metallic iron can be found in numerous ore deposits, some of which include goethite, hematite, magnetite and taconite. Traditionally, iron values have been collected by low-intensity magnetic separation. This process involves the use of a drum-type magnetic separator having a field intensity on the order of 3000 gauss or less. Although this process of recovery has proven extremely effective for the magnetic iron ores, it is virtually ineffective for recovering iron values from oxidized iron ores. By oxidized iron ores what is meant are those non-magnetic iron ores having an iron content of about 30 to 40 percent found in the deposits of semitaconite, oxidized taconite and hematitic-goethitic jaspers.

In the face of ever dwindling reserves of high grade magnetic iron ores, it is expected that greatly increased tonnage of these oxidized iron ores will be recovered in the foreseeable future. Thus, an efficient system of recovery becomes increasingly necessary.

The employment of traditional flotation processes for recovering oxidized iron ores prior to the 1960's resulted in the concentration of substantial tonnage of metallic iron values. However, the application of these conventional procedures presented a significant drawback, that being the excessive losses incurred during the desliming stage when significant amounts of iron oxides report to the slime fraction. In an effort to overcome this drawback, a modified flotation system was developed during the 1960's that specifically met the needs for improved flotation recovery of iron values from oxidized iron ores. This system consists of dispersing the finely ground oxidized iron ore in an aqueous medium and initially subjecting it to a selective flocculation. Following the selective flocculation stage, the system is deslimed to remove the silica-bearing fines and the flocculated residues remaining are then concentrated to final grade by a flotation of the non-ferrous siliceous material left unremoved. The essential characteristic of this system which distinguishes it from conventional flotation processes is the preconditioning of the oxidized iron ores by selective flocculation before the flotation of the siliceous gangue. This is not to say a flocculating stage is novel in the beneficiation of mineral ores. Conventional flocculants such as lime, sulfuric acid and the natural and synthetic polymeric substances have long been employed. However, in conventional applications these flocculants are employed after flotation and act on all of the dispersed solids to improve the filtration of the products or as an aid in thickening finely ground pulps. Such a use is, however, distinct from the selective flocculation conducted in the oxidized iron ore system. In selective flocculation, the flocculants are added prior to the flotation and desliming stages and are selective in their flocculating properties so as to effectuate a separation between mineral species contained in the aqueous dispersion. In the oxidized iron ore system, the selective flocculant causes the flocculation of iron containing values while leaving the non-ferrous siliceous materials in suspension.

Selective flocculants presently known in the art include tapioca flour, potato starch, natural and modified starches and polyacrylamides as taught in U.S. Pat. No. 3,292,780 issued Dec. 20, 1966 to Frommer et al. Also known is the use of acrylic acid polymers containing at least 70 mole percent of acrylic acid units as selective flocculants for recovering hematitic iron ore from siliceous materials as disclosed in U.S. Pat. No. 4,081,357 issued to Werneke et al. in 1978. Currently, the most frequently employed selective flocculant for oxidized iron ore systems is corn starch.

Although the employment of starches in the oxidized iron ore recovery as selective flocculants has proven efficient, major drawbacks continue to persist. Specifically, from an ecological vantage point, the presence of residual starches in waste water increases ts biodegradeable oxygen demand and thereby creates an environmental problem in the disposal of the waste waters. From a commercial vantage point, there are a ever increasing number of countries in which the use of reagents having a food value, such as starch, is prohibited in commercial applications.

Accordingly, there exists the need for a process of selective flocculation that will employ new selective flocculants which can both overcome the deficiencies of the conventional processes and yet maintain or improve upon selectivity and ultimate iron value recovery.

SUMMARY OF THE INVENTION

The instant invention provides for a process of selective flocculation for iron ore values wherein a ground iron ore containing siliceous gangue is first dispersed in a aqueous medium and thereafter conditioned with an effective amount of a selective flocculant thereby selectively flocculating the iron-containing particles without causing a corresponding flocculation of the siliceous gangue. Said selective flocculant is a partially carboxylated polyacrylamide containing from about 20 to 65 percent carboxyl groups and of a molecular weight in excess of one million.

DETAILED DESCRIPTION OF THE INVENTION

In accordance with the instant invention, there is provided a process of selective flocculation. Although this process is specifically designed to selectively flocculate iron values from their associated siliceous gangue, and more specifically for selectively flocculating an oxidized iron ore from its associated siliceous gangue, it is believed that this process is additionally compatible with other ore systems wherein the mineral values are likewise to be selectively flocculated from their associated siliceous gangue such as cassiterite, oxidized copper ores and the like. The process itself involves dispersing a finely ground iron ore in an aqueous medium, with the higher degrees of mineral dispersion being preferred. To this dispersion is added an effective amount of the partially carboxylated polyacrylamide selective flocculant used in the instant invention. By "effective amount" of the selective flocculant is meant an amount of the selective flocculant that is effective in producing the desired degree of selective flocculation which, in turn, results in the desired degree of recovery of iron values. The particular amount that is effective will vary depending upon variables such as the particular ore processed, the specific composition of the selective flocculant, the degree of dispersion, the particles size, and the like. Therefore, a precise statement as to the effective amount is not possible. Generally, however, the effective amount will range from about 0.1 to 2.0 pounds of selective flocculant per ton of ore processed.

The selective flocculant employed in the instant process is a partially carboxylated polyacrylamide. Partially carboxylated polyacrylamides have been described and methods of preparing the same outlined previously in the art. Specifically, U.S. Pat. No. 3,215,680 issued to Kolodny in 1965 describes a process of preparing such a material by polymerizing acrylamide in an aqueous medium in the presence of a monovalent inorganic salt of an inorganic acid. Additionally, partially carboxylated polyacrylamides have been described in U.S. Pat. No. 3,573,263 issued to Gill in 1971, wherein a process of polymerizing an ethylenically-unsaturated monomer using an initiator system comprising a redox system and an azo compound free-radical source is set forth. These and other suitable methods of preparing the partially carboxylated polyacrylamides useful in the instant process are consistent with the spirit of the present invention.

The partially carboxylated polyacrylamides of the present invention must contain from about 20 to 65 percent carboxyl groups. In preferred instances, the polymers contain from about 35 to 55% carboxyl groups. Additionally, the partially carboxylated polyacrylamides have a high molecular weight, such high molecular weights are on the order of one million or more and preferably, in the range of five to fifteen million. The absence of the requisite carboxyl groups or molecular weight causes significant losses in selectively, especially when the selective flocculant used in the instant invention is combined with starch.

After the partially carboxylated polyacrylamide has been added to the ore dispersion, the slurry is vigorously mixed to ensure uniform distribution of the polymer throughout the aqueous dispersion. From this mixture the iron values are settled as an underflow concentrate while the siliceous gangue material remains suspended in the supernatant liquid. Generally, effective settling is accomplished within about 15 minutes after the selective flocculant has been added and mixed uniformly into the ore dispersion, however, the particular time of settling is not deemed critical and may vary widely depending upon the specific ore processed, the polymer composition employed, the polymer dosage applied and the like.

Once settling has been effectively obtained, the iron concentrate is recovered. This operation can be performed according to any conventional procedure while employing any conventional equipment associated with such procedures. Typically, the procedure consists of decantation of the supernatant liquid followed by a flotation step in which the remaining siliceous gangue is removed by froth flotation leaving behind the iron values.

The following specific examples illustrate certain aspects of the present invention, and more particularly, point out methods of evaluating the unique advantages of the process of the instant invention. A general procedure is additionally set forth describing in detail the procedures generally followed. However, the examples and procedures are set forth for illustration only and are not to be construed as limitations on the present invention except as set forth in the appended claims. All parts and percentages are by weight unless otherwise specified.

GENERAL PROCEDURE

600 Parts of a crude iron ore containing approximately 50% hematite is added to 400 parts of deionized water. To this solution is added sodium silicate and sodium hydroxide in amounts sufficient to raise the pH to about 10.5–11.0. The resulting caustic solution is ground to a fine consistency, approximately 85%–500 mesh. This finely ground ore is then diluted to about 7.5% solids. The resultant pulp is stirred into a large vat to maintain slurry consistency and to evaluate settling conditions.

To 8 liters of this pulp there is uniformly added 0.1 part of calcium hydroxide (equivalent to 17 ppm. calcium as calcium carbonate in the final solution) which is stirred vigorously to simulate a softened water containing residual calcium hardness. One liter aliquots are removed from this mixture and placed into capped bottles.

During each test, the aliquots are added to 1000 ml. graduated cylinders fitted with porous plungers for thorough pulp mixing. The selective flocculants to be evaluated are next added as dilute solutions and vigorously "plunged" for 15 seconds to ensure thorough mixing of the flocculant and the pulp. The treated pulp is allowed to settle for 5 minutes and thereafter the top 900 ml. of pulp is carefully siphoned off as the overflow. The residual 100 ml. constitutes the underflow.

The underflow and overflow are carefully weighed and assayed to determine recovery and grade of the ore. Recovery ($R_u$) of the underflow is defined as:

$$R_u = \frac{(\% \, I.O.U.) \times (wt. \, U.)}{[(\% \, I.O.U.) \times (wt. \, U.)] + [(\% \, I.O.O.) \times (wt. \, O.)]}$$

Recovery ($R_o$) of the overflow is defined as:

$$R_o = 1 - R_u$$

Residual gangue ($G_u$) in the underflow is defined as:

$$G_u = \frac{(100 - \% \, I.O.U.) \times (wt. \, U.)}{[(100 - \% \, I.O.U.) \times (wt. \, U.)] + [(100 - \% \, I.O.O.) \times (wt. \, O.)]}$$

Residual gangue ($G_o$) in the overflow is defined as:

$$G_o = 1 - G_u$$

Grade iron oxide in the underflow ($X_u$) is defined as:

$$X_u = wt. \, I.O.U./wt. \, U.$$

Grade iron oxide in the overflow ($X_o$) is defined as:

$$X_o = wt. \, I.O.O./wt. \, O.$$

Grade gangue in the underflow ($Y_u$) is defined as:

$$Y_u = \frac{wt. \, U. - wt. \, I.O.U.}{wt. \, U.}$$

Grade gangue in the overflow ($Y_o$) is defined as:

$$Y_o = \frac{wt. \, O. - wt. \, I.O.O.}{wt. \, O.}$$

where $X_u + Y_u = 1$ and $X_o + Y_o = 1$

Selectivity is defined as:

$$\text{Selectivity} = [(R_u \times X_u) - (R_o \times X_o)] - [(G_u \times Y_u) - (G_o \times Y_o)]$$

wherein:
% I.O.U.—percent iron oxide in underflow
% I.O.O.—percent iron oxide in overflow
wt. U.—weight of underflow
wt. O.—weight of overflow where a value of "2" corresponds to perfect selectivity (i.e., 100% of the hematite and none of the gangue in the underflow and, correspondingly, 100% of the gangue and none of the hematite in the overflow). A selectivity of "0" corresponds to a completely random or non-selective process.

EXAMPLES 1 AND 2

Following the General Procedure set forth above, a partially carboxylated polyacrylamide having a molecular weight of about 6.5 million and containing approximately 42% carboxyl groups is employed at various dosages at the selective flocculant. Test results are set forth in Table I below.

COMPARATIVE EXAMPLES A AND B

Following the General Procedure set forth above, a corn starch is employed at various dosages as the selective flocculant. Test results are set forth in Table I below.

COMPARATIVE EXAMPLES C

Following the General Procedure set forth above, a partially carboxylated polyacrylamide having a molecular weight less than 1 million and containing approximately 85% carboxyl groups in employed as the selective flocculant. Test results are set forth in Table I below.

COMPARATIVE EXAMPLE D

Following the General Procedure set forth above, a partially carboxylated polyacrylamide having a molecular weight in excess of 1 million and containing approximately 95% carboxyl groups is employed as the selective flocculant. Test results are set forth in Table I below.

TABLE I

IRON ORE SETTLING TESTS

| Example | Dosage lb./ton | Overflow Wt% | Overflow Fe Assay | Underflow Wt% | Underflow Fe Assay | % Fe Recovery | Selectivity Valve |
|---|---|---|---|---|---|---|---|
| BLANK | — | 51.6 | 0.272 | 48.4 | 0.416 | 58.9 | +0.410 |
| 1 | 0.012 | 19.8 | 0.120 | 80.2 | 0.403 | 93.1 | +0.508 |
| 2 | 0.046 | 20.0 | 0.097 | 80.0 | 0.431 | 94.7 | +0.639 |
| A | 0.278 | 26.3 | 0.136 | 73.7 | 0.413 | 89.5 | +0.599 |
| B | 0.510 | 21.1 | 0.116 | 78.9 | 0.418 | 93.1 | +0.582 |
| C | 0.034 | 20.6 | 0.216 | 79.6 | 0.394 | 87.7 | +0.366 |
| D | 0.003 | 13.6 | 0.250 | 86.6 | 0.359 | 90.3 | +0.133 |

EXAMPLE 3

When the General Procedure set forth above is followed employing a partially carboxylated polyacrylamide having a molecular weight of about 3 million and containing about 35% carboxyl groups as the selective flocculant, substantially equivalent results are obtained to those reported in Examples 1 and 2.

EXAMPLE 4

When the General Procedure set forth above is followed employing a partially carboxylated polyacrylamide having a molecular weight of about 15 million and containing about 25% carboxyl groups as the selective flocculant, substantially equivalent results are obtained to those reported in Examples 1 and 2.

EXAMPLE 5

When the General Procedure set forth above is again followed employing a partially carboxylated polyacrylamide having a molecular weight of about 5 million and containing about 65% carboxyl groups as the selective flocculant, substantially equivalent results are obtained to those reported in Examples 1 and 2.

EXAMPLES 6 & 7

Following the General Procedure set forth above, a combination of corn starch and the partially carboxylated polyacrylamide employed in Examples 1 and 2 is used as the selective flocculant at various dosages. Test results are set forth in Table II below.

EXAMPLES 8 & 9

Following the General Procedure set forth above, a combination of corn starch and a partially carboxylated polyacrylamide having a molecular weight of about 10 million and containing about 53% carboxyl groups is employed as the selective flocculant at various dosages. Test results are set forth in Table II below.

COMPARATIVE EXAMPLE E

Following the General Procedure set forth above, a combination of corn starch and the partially carboxylated polyacrylamide used in Comparative Example D is employed as the selective flocculant. Test results are set forth in Table II below.

TABLE II

| EXAMPLE | Dosage lb./ton | IRON ORE SETTLING TESTS | | | | % Fe Recovery | Selectivity Value |
|---|---|---|---|---|---|---|---|
| | | Overflow | | Underflow | | | |
| | | Wt. % | Fe Assay | Wt. % | Fe Assay | | |
| BLANK | — | 51.6 | 0.272 | 48.4 | 0.416 | 58.9 | +.410 |
| 6 | 0.003 polymer 0.169 starch | 21.8 | 0.121 | 78.2 | 0.422 | 92.6 | +.598 |
| 7 | 0.0057 polymer 0.115 starch | 21.2 | 0.120 | 78.8 | 0.430 | 93.0 | +.617 |
| 8 | 0.0063 polymer 0.178 starch | 20.0 | 0.105 | 80.0 | 0.392 | 93.7 | +.470 |
| 9 | 0.0065 polymer 0.206 starch | 17.5 | 0.093 | 82.5 | 0.419 | 95.5 | +.563 |
| E | 0.0014 polymer 0.135 starch | 14.7 | 0.156 | 85.3 | 0.364 | 93.1 | +.263 |

We claim:

1. A process of selective flocculation for iron ore values wherein a ground iron ore containing siliceous gangue is first dispersed in an aqueous medium and thereafter conditioned with an effective amount of a selective flocculant thereby selectively flocculating the iron-containing particles without causing a corresponding flocculation of the siliceous gangue wherein said selective flocculant is a partially carboxylated polyacrylamide containing from about 35 to 55 percent carboxyl groups and of a molecular weight in excess of one million.

2. The process of claim 1 wherein the molecular weight of the selective flocculant is from about 5 to 15 million.

3. The process of claim 1 wherein the effective amount of the selective flocculant added is from about 0.1 to 2.0 pounds per ton of iron ore.

4. The process of claim 1 wherein starch is added in combination with the selective flocculant.

5. The process of claim 1 wherein the ground iron ore is an oxidized iron ore.